March 30, 1943.   H. S. POLIN   2,315,005
PROCESS FOR MAKING PLASTIC SUBSTANCES AND THE PRODUCTS THEREOF
Filed Jan. 12, 1940
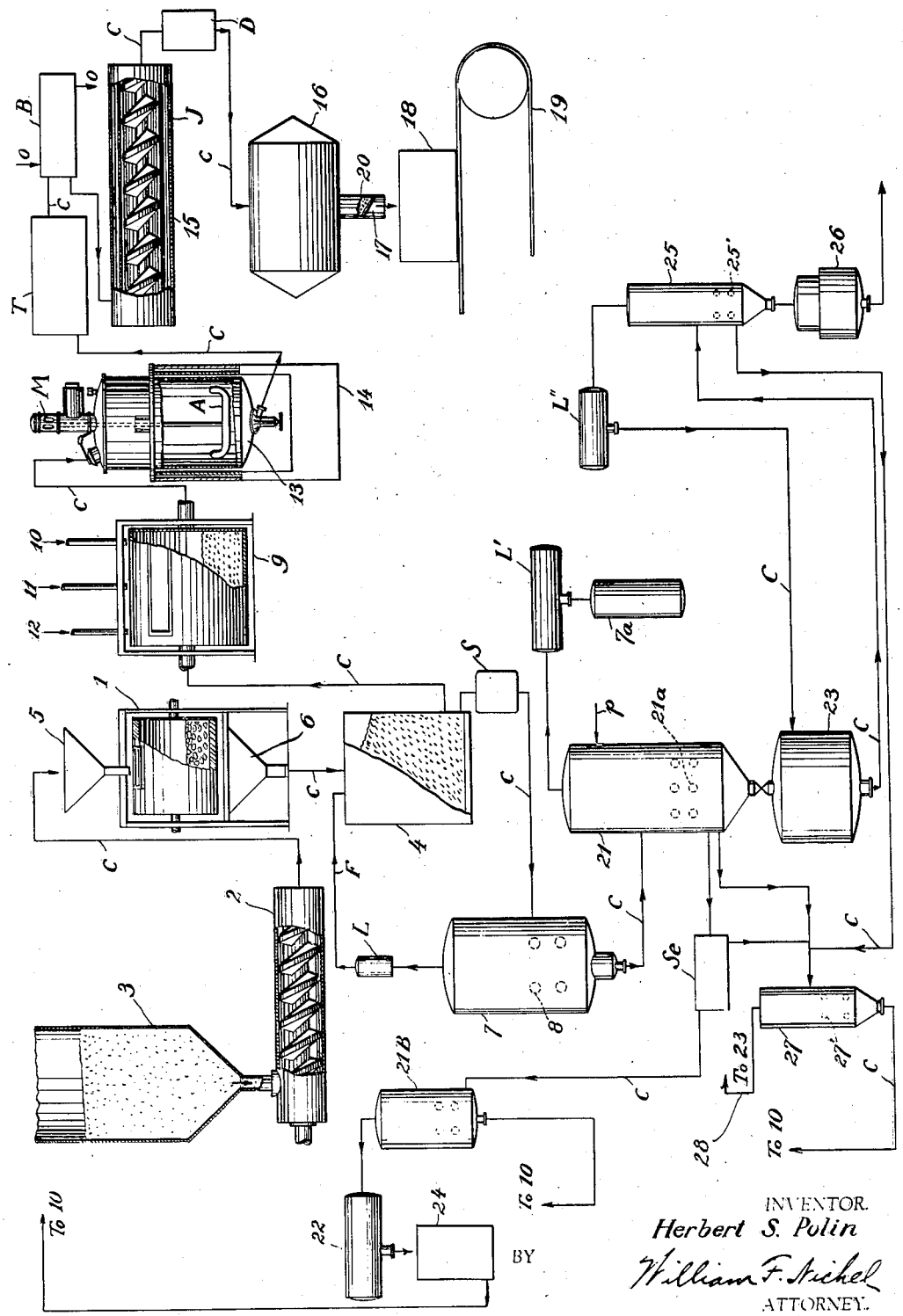
INVENTOR.
Herbert S. Polin
BY William F. Michel
ATTORNEY.

Patented Mar. 30, 1943

2,315,005

UNITED STATES PATENT OFFICE 2,315,005

PROCESS FOR MAKING PLASTIC SUB-STANCES AND THE PRODUCTS THEREOF

Herbert S. Polin, New York, N. Y.

Application January 12, 1940, Serial No. 313,524

9 Claims. (Cl. 106—154)

This invention pertains to improvements in methods for making a molding compound and the products thereof and especially for the treatment of natural vegetable products so as to extract certain substances therefrom and retain and treat others in a manner that will yield a material having the desired properties.

In my prior copending application for Patent No. 2,207,069, granted July 9, 1940, I have set forth a method or process by which a plastic molding compound in the form of a powder is produced from the coffee bean. In the practice of this method, the coffee bean is ground up and subjected to the action of a solvent, and certain of the natural ingredients of the coffee bean are then reacted in the presence of the fibre particles, so as to provide a natural mixture of binder and filler, which can be easily molded and which polymerizes to a solid during molding, and which can be blended with any coloring matter desired.

An object of this invention is primarily to provide improved methods for performing the process described in my said prior application, continuously and in an efficient way, so that the molding compound can be produced in large quantities and at relatively low cost.

Other objects and advantages of the invention will be made clear in the following specification, and the novel features are defined in the appended claims; but the arrangement of parts and relative location of the different units employed, as well as their shape, design and particular construction, and the steps and order of proceeding as well as other details may, of course, be varied within wide limits, without departing from the principle of the invention or exceeding its spirit and scope.

The drawing presents a schematic view showing the apparatus and the mode of performing the process, the connections between the parts and members of the installation, and the preferred order in which the various steps of the method are accomplished.

To produce a plastic having characteristics according to this invention, it is unnecessary to include any chemical materials except those naturally occurring in the coffee bean during growth thereof or produced by inter-reacting the latter under heat and pressure. Some of the chemical ingredients are unnecessary to the process, and may be extracted and rejected. The others are utilized to give the desired result, the vegetable fiber in the coffee bean serving as the filler for the plastic molding compound, and other ingredients producing the binder; the whole, upon completion of polymerization, yielding articles of any desired shape and color, and with all of the physical properties desirable in molding compounds of this nature.

In practice, the first step is the grinding of the green coffee bean into a flour, and this is effected in a suitable grinder of the ball-mill or other type, indicated at 1. The beans are fed to the grinder 1 by means of a screw or other suitable conveyor 2, which receives them from a bin or hopper 3, called the green coffee hopper. The conveyor delivers the green coffee beans by a conduit C (which also indicates similar transfer conduits between other points, as hereafter set forth) to a charge hopper 5 through which the beans pass to the mill 1; and after grinding is completed, the material is delivered by the mill to a hopper 6, called the ground coffee hopper, connected by means of a suitable feed conduit to an extractor 4. This extractor may be of the Soxhlet type, or any suitable modification thereof, or of any other suitable type. Within the extractor the ground coffee charge is subjected to the action of a solvent, which removes certain substances among which are those not suitable or unnecessary for the final reaction product.

A suitable solvent is chloroform, but any other proper extraction medium may be employed. However, if it is desired to recover caffeine, the solvent must exert action on both coffee oils and the caffeine. It is fed into the extractor chamber 4 from a still 7 through suitable condensing means and feed lines, indicated at L and F. Integral with the still is a suitable heating device. Obviously, any feasible way of supplying heat to the still 7 may be used: in particular a steam jacket or steam coils indicated at 8 may be employed. The solvent charge is vaporized in the still 7; it enters the extractor 4 and extracts from the ground coffee the caffeine and the fatty oils and a quantity of other complex constituents, and these are discharged with the solvent from the extractor and pass back into the still 7. A suitable filter S to remove fines or other suspended matter may be placed between the extractor and the still. The solvent is condensed by suitable heat-exchange just before (in the condenser L) or after it enters the extractor 4, so that it is a liquid when it comes in contact with the ground coffee. As it is recirculated from the extractor to the still 7, it is of course charged with the oil and caffeine, etc. These latter, however, are not volatile at the still temperature, and the solvent can be distilled off in the still 7, condensed, and given another pass through the extractor, thus accomplishing a continuous extracting operation. From the still 7 the caffeine, oils, etc. and some of the solvent are run to another complex unit 21, in which, as will be described, the extracted materials and solvents are subjected to fractionation.

From the extractor chamber 4 the modified charge of ground coffee is discharged through another conduit to a mixer 9 that is preferably of the rotary type. This mixer has ports or pipes 10, 11, and 12, the first being for the return to the contents of the mixer of certain of the materials which have been extracted in the chamber 4, the pipe 11 being for the admission of water, and the pipe 12 being for the introduction, if desired, of a small percentage of mineral acid or other suitable reagent to act as a catalyst and facilitate chemical reaction. The acid may be sulfuric acid, and the quantity used is about 2% by weight.

As set forth in my prior application above-mentioned, the solvent in the chamber 4 extracts the fatty oils from the coffee. It also removes a portion of the tannins, and the caffeine. When the charge reaches the mixer 9, portions of the previously fractionated fatty oils as well as the extracted fraction of tannins, are restored to the coffee, and these ingredients are thoroughly incorporated in the coffee flour by the mixer, which delivers them through a suitable feed spout C to a pressure reaction chamber, such as an autoclave of well known construction, shown at 13.

This autoclave is sealed and the temperature of the charge is raised to approximately 300° F. while the material is agitated. For this purpose an agitator A on a shaft in the autoclave, driven by an outside motor M is employed. The temperature is maintained at this point for approximately one hour under a corresponding pressure of approximately 350 pounds per square inch and the contents of the autoclave are then blown out by the internal pressure into a blow-down tank T. At this point, the reaction product may, if desired, be washed with water in a washer B connected to both the chamber T and to a dryer 15. The heating of the autoclave is effected by a medium in the jacket 14 or in any other well-known fashion. The washer B has water inlets and outlets at O.

The dryer 15 is preferably of the rotary-vacuum type, and contains a series of blades with an enveloping jacket J for a heating medium; and so arranged as to churn the material to produce efficient exposure to the heating surface, and to facilitate transfer by way of a conduit or spout C to a packaging bin 16. From this bin the final product, which will be in the form of a powder, usually dark brown in color, can be withdrawn and filled into containers to be stored or shipped. One such container is shown at 18, and when the process is in operation, a belt 19 can carry a number of containers beneath the bin 16, and each will be filled in turn. The discharge spout of the bin 16 shown at 20 is provided with a closure 17 to control the filling of the containers and shut the bin when each container has received the allotted amount.

If desired, coloring material, lubricants or other desired materials can be added to the plastic. For this purpose a blender D may be interposed in the line of the spout C between the drier and the packaging bin. When materials are thus introduced, the blender D should be rotated and ribs or baffles provided inside to diffuse the additive matter throughout the contents.

After entering the unit 21, the materials extracted from the coffee in chamber 4 are separated as will now be described, and the portion suitable to the formation of a resinous compound is remixed with the coffee in the mixer 9. The unit 21 comprises a combined chloroform evaporator and caffeine extractor. By means of heater tubes 21a, the chloroform, being most volatile, is evaporated from the charge. It is passed through a condenser L' into a recovery vessel 7a. Simultaneously, a limited amount of steam, hot water, or both, is admitted from a pipe p into the evaporator 21, and there acts to dissolve caffeine, tannins, etc., from the mass of oil. As the caffeine accumulates in the limited quantity of water, the water ultimately becomes saturated with caffeine, and the caffeine settles to the bottom of the evaporator, and is drawn off to a crude-caffeine receiver 23.

At the completion of the above fractionating process, the coffee oil is run to a still 21B. Suitable separators Se to remove water, etc., from the oil may be placed between the units 21 and 21B. The still 21B is heated by any suitable means with resulting fractional vaporization of the oils. The vapors from the still 21B are condensed in the condenser 22 and run into the receiver 24. At the proper point, the fractionation is terminated, and the residuum or the overhead, or both, or suitable portions of each are then run by suitable conduits into the pipe 10, and thence into the coffee in the mixer 9. The receiver 24 may be high enough to feed into the mixer 9 by gravity. In the crude-caffeine receiver 23, the caffeine is admixed and dissolved with distilled water, and thence is passed to the caffeine purifier-evaporator 25 by suitable conduit C. In the evaporator 25 the water is evaporated from the solution by a suitable heating system 25' until the caffeine precipitates. The caffeine is fed directly from the evaporator 25 into the caffeine dryer 26. Thence the purified and dried caffeine may be withdrawn to storage or other disposition. The evaporated water in the purifier 25 may be run through a condenser L" back into the receptacle 23 for re-use.

In evaporators 21 and 25 there remains a quantity of aqueous mother liquor containing tannins and small quantities of other water-soluble constituents. After the separation of the caffeine in the units 21 and 25, these mother liquors are combined and fed into the evaporator 27 having heating means 27'. Here the liquors may be concentrated to any desired extent, and may then be fed through a suitable conduit C to the pipe 10, and remixed with the coffee in the mixer 9. The water distilled off in the evaporator 27 may be run into the vessel 23, or anywhere else as needed. The units 21B and 27 may also be elevated to feed by gravity into the mixer 9. Conveniently the separator Se, which is of the gravity type, is also connected as shown to the evaporator 27. The outlet for the vapors from the evaporator 27 is shown at 28, and these vapors, being distilled water, may be delivered to the receptacle 23.

From the foregoing description, it will be seen that the invention embodies a very practical and efficient method for treating coffee and removing such substances as have to be extracted, while utilizing the remaining substances to give a compound that has plastic properties. Some of the extracted substances are restored to the coffee in the mixer 9, and the result is a type of resin with a filler, which is ready for molding, is homogenous, and very well adapted for the production of many commercial articles.

Of course the retorts, recovery vessels, conveyors, conduits and all other units will be of any well known construction and design to render them capable of operating as the conditions of practice demand, and various units will be so connected that the materials under treatment can be readily transferred from one to another. Also the various units may be coupled as usual to steam and water pipes, or other facilities needed for washing or cleaning or draining. Typical equipment such as heat exchangers, solvent fractionators, etc. are introduced according to chemical engineering practice to conserve heat and materials and to conduct the process in the most economical manner.

While the choice of solvent would necessarily be dictated by the selection of that particular constituent it is desired to remove, solvents such as carbon tetrachloride, water, alcohol, diethylene oxide, benzol, etc., each has special extracting properties. Under certain circumstances it has been found advantageous successively to extract with a combination or a multiplicity of the above-enumerated solvents, or others characterized by their ability to act separately upon specific constituents of the coffee bean. Since the molding compound eventuating from the application of the process described is a form of composite resin, it may, under certain circumstances, to achieve the variation in physical properties of the finished material, be necessary to differentially foster the resin-forming reaction. Thus the tannins may be removed while the sugars remain and undergo a portion of their reaction, and then the tannins be introduced at a critical stage or at the conclusion of the sugar reaction. The apparatus shown provides for only one solvent extraction at a time, but it is feasible under large industrial practice to have two or more extraction vessels in a battery, with the material passed from extractor to extractor, with each extractor containing a solvent acting upon a different constituent of the coffee bean.

Having described my invention, what I believe to be new and desire to secure and protect by Letters Patent of the United States is:

1. The method of preparing a plastic and recovering caffeine from coffee, which consists in treating the green coffee bean to render the fiber thereof suitable to serve as a filling material, removing some of the ingredients of the substance of said bean comprising oils, caffeine and tannins, separating said oils and the caffeine to recover the latter, restoring said tannins and part of said oils and remixing them with the other ingredients retained in said substance to form a binder, and subjecting the mass to pressure and heat till a moldable product is obtained.

2. The method of preparing a molding material consisting in extracting oil, tannins and caffeine from the green coffee bean, separating the caffeine, reintroducing the tannins and a portion of the oil into the coffee, and reacting the mass in the presence of water under pressure and temperature conditions to form a molding material.

3. The method of preparing a molding material consisting in extracting oils, tannin and caffeine from the green coffee bean, separating the caffeine, separating the tannins, fractionating the oils, reintroducing the tannins and a portion of the oils into the coffee, and reacting the mass in the presence of water under temperature and pressure conditions to form a molding material.

4. Process for forming a plastic product and for recovering caffeine from coffee which comprises: comminuting coffee beans, treating with solvent to extract oil and the caffeine therefrom, dissolving the caffeine in water to separate and recover same from the extracted oil, subjecting the extracted coffee material to a time and temperature treatment in the presence of dilute mineral acid to form moldable reaction products from the constituents of said material in the presence of other constituents to act as a filler, washing said products and filler, and then drying same.

5. Process for forming plastic products and for recovering caffeine from coffee which comprises: comminuting coffee beans, treating with solvent to extract oil and the caffeine therefrom, separating and recovering the caffeine from the oil, subjecting the extracted coffee material to a time and temperature treatment in the presence of dilute mineral acid to form moldable reaction products from the constituents of said material in the presence of other constituents to act as a filler, washing said products and filler, and then drying same.

6. Process for forming a plastic product from coffee which comprises: comminuting coffee beans, treating with solvent to extract oil and the caffeine therefrom, and subjecting the resulting extracted material, while substantially free of recoverable caffeine, to a time and temperature treatment in the presence of an acid catalyst and water to form plastic moldable reaction products.

7. Process for forming a plastic product and for recovering caffeine from coffee which comprises: comminuting coffee beans, treating with solvent to extract oil and the caffeine therefrom, distilling the solvent from the extract and then condensing the solvent and recycling same through the extracted material, separating and recovering caffeine from the distillation residue, and subjecting extracted constituents of the coffee to a time and temperature treatment in the presence of an acid catalyst and water to form plastic moldable reaction products.

8. The product comprising the plastic moldable reaction products resulting from the process of claim 6.

9. The product comprising the molding material resulting from the process of claim 3.

HERBERT S. POLIN.